United States Patent [19]

Saito et al.

[11] Patent Number: 5,796,741
[45] Date of Patent: Aug. 18, 1998

[54] ATM BUS SYSTEM

[75] Inventors: Kazuo Saito, Yokohama; Koji Anai, Yokosuka; Keiju Igarashi, Nagoya; Takeshi Nishikawa, Yokosuka; Ryoichi Himeno, Yokohama; Kazuhiro Yoguchi, Yokosuka, all of Japan

[73] Assignee: Nippon Telegraph and Telephone Corporation, Tokyo, Japan

[21] Appl. No.: 611,048

[22] Filed: Mar. 5, 1996

[51] Int. Cl.$^6$ .................. H04L 12/403; H04L 12/56
[52] U.S. Cl. ............................... 370/439; 370/395
[58] Field of Search ........................ 370/395–397, 370/438–440, 362–364

[56] References Cited

U.S. PATENT DOCUMENTS

| | | | |
|---|---|---|---|
| 5,062,106 | 10/1991 | Yamazaki | 370/94.1 |
| 5,150,356 | 9/1992 | Tsutsui | 370/16.1 |
| 5,321,691 | 6/1994 | Pashan | 370/58.3 |
| 5,381,410 | 1/1995 | Grenot | 370/60.1 |
| 5,452,330 | 9/1995 | Goldstein | 375/257 |
| 5,463,624 | 10/1995 | Hogg | 370/85.6 |
| 5,612,958 | 3/1997 | Sannino | 370/394 |

*Primary Examiner*—Douglas W. Olms
*Assistant Examiner*—Matthew C. Phillips
*Attorney, Agent, or Firm*—Finnegan, Henderson, Farabow, Garrett & Dunner, L.L.P.

[57] ABSTRACT

An ATM bus 11 is a bus for performing data transfers in an asynchronous transfer mode, while a control bus 8 is a bus for transferring control signals sent out by a central control section 1 in order to control bus users $10a$–$10d$. The bus users $10a$–$10d$ and a bus arbitration circuit 12 are connected to this ATM bus. The bus users 10A–$10d$ are ATM bus users. When the bus users $10a$–$10d$ simultaneously issue bus use requests, the bus arbitration circuit 12 selects a single bus use request from among these requests. Then, all of the bus users are sent data identifying the bus user which issued the selected bus use request. As a result, only the selected bus user begins a data transfer operation using the ATM bus 11.

12 Claims, 14 Drawing Sheets

FIG.6

1 BUS CYCLE

| 10a USED | 10b USED | 10a USED | 10b USED | 10a USED | 10b USED | 10a USED | 10b USED |
|---|---|---|---|---|---|---|---|

... ...

TIME →

FIG.7

1 BUS CYCLE

| 10b USED | 10b USED | 10b USED | 10b USED | 10b USED | 10b USED | 10b USED | 10b USED |
|---|---|---|---|---|---|---|---|

... ...

TIME →

FIG.8

1 BUS CYCLE

| 10c USED | 10d USED | 10c USED | 10d USED | 10c USED | 10d USED | 10c USED | 10d USED |
|---|---|---|---|---|---|---|---|

... ...

TIME →

- - - - - REAL-TIME MEDIA DATA
———— CONTROL DATA

ATM BUS SYSTEM

BACKGROUND OF THE INVENTION

1. Technical Field of the Invention

The present invention relates to ATM bus systems suitable for simultaneous processing of control processing and communications processing in computer devices such as personal computers and workstations.

2. Background Art

In recent years, there has been an increasing demand for computer devices such as personal computers and workstations to have various processing capabilities, such as large-scale data transfer accompanied with image processing, simultaneous processing of multiple media, and real-time video communications, that is, the ability to perform control processing and communications processing in parallel.

Conventionally, these types of requirements have been handled by increasing the data transfer rates of single buses provided within computers. FIG. 16 is a block diagram illustrating the basic structure of a conventional data transfer system. A central control section 1 uses control signals 6a, 6b and 6c transmitted through a control bus 8 to control a data storage section 2, a data processing section 3 and a network line connection section 4. The data storage section 2 stores real-time media data. In this case, real-time media data denote video and audio data requiring real-time processing. The data processing section 3 prepares real-time media data according to a pre-determined format. The network line connection section 4 interfaces with an ATM network 5 to connect the above system with the ATM network 5.

Signal 7a is real-time media data transferred from the data storage section 2 to the data processing section 3. Similarly, signal 7b is real-time media data transferred from the data processing section 3 through the network line connection section 4 to the ATM network 5. In this case, the ATM (Asynchronous Transfer Mode) network denotes a communication network which performs high-speed processing by dividing all of the communication data, having bit rates of from tens of bps to hundreds of Mbps, into cells (packets) having fixed lengths of 53 bytes (wherein 1 byte=8 bits) and mixing them into transmission routes for transfer in order to perform high-speed packet exchange. Each cell in the ATM network is formed from a 5-byte header (control data portion) and a 48-byte data field. The advantages of ATM networks lie in their high interchangeability and efficiency due to their ability to mix communication traffic of various speeds, including high speeds.

Next, the operation of a data transfer system according to the above structure will be explained for the case wherein a video image signal, as an example of real-time media data, is transferred from the data storage section 2 through the ATM network 5 to a different computer. The central control section 1 sends a control signal 6b via the control bus 8 in order to instruct the data processing section 3 to receive a video signal. In response, the data processing section 3 returns a signal to the central control section 1 indicating whether or not it is capable of receiving the video signal. After confirming that the data processing section 3 is able to receive the video signal, the central control section 1 sends a control signal 6a via the control bus 8 in order to instruct the data storage section 2 to send the video signal to the data processing section 3. Then, the data storage section 2 sends the video signal 7a, which has been pre-stored in the data storage section 2, to the data processing section 3 via the control bus 8. The data processing section 3 receives the video signal 7a sent through the control bus 8 and prepares it to a pre-determined format.

Next, the central control section 1 sends a control signal 6c via the control bus 8 in order to instruct the network line connection section 4 to transfer the video signal 7b formatted from the video signal 7a to the ATM network 5. In response, the network line connection section 4 returns a signal to the central control section 1 indicating whether or not the video signal is capable of being transferred. After confirming that the network line connection section 4 is able to transfer the video signal, the central control section 1 sends the control signal 6b via the control bus 8 in order to instruct the data processing section 3 to send the video signal 7b to the network line connection section 4. Then, the data processing section 3 sends the video signal 7b to the network line connection section 4 via the control bus 8. Finally, the network line connection section 4 transfers the video signal 7b to the ATM network 5.

The conventional data transfer system described above has a weakness in that increases in the amount of data being processed cause control data and real-time media data to compete upon the same bus during continuous data transfer, thereby generating waiting periods between data and making it difficult to achieve real-time transmission of media data. For example, in the conventional data transfer system shown in FIG. 16, if the central control section 1 uses the control signal 6a to instruct the data storage section 2 to send data or the control signal 6b to instruct the data processing section 3 to receive data when a continuous video signal 7b is being transferred to the network line connection section 4 through the ATM network 5, the data signal 6a or 6b will compete with the video signal 7b, as a result of which the transmission of the signal 7b may be interrupted. Such interruptions cause reduced picture quality and image disturbances in the remote computer to which the video signal 7b was being sent through the ATM network 5. As a result, the processing of real-time media data is often interrupted during multi-media communications wherein video signals are processed for communications.

As a solution to this problem, cell buses (transfer type) which use CUBIT (VLSI), developed by Tran Switch Corporation (USA), are known as technology for allowing ATM-type data transfer by buses. Additionally, MVIP (Multivender Integration Protocol) is known as a technology for performing data transfer by providing an STM (Synchronous Transfer Mode) bus independent from the control bus. This standard was introduced in 1990 by Natural Microsystems (NMS), Mitel and five other companies, and GO-MVIP (The Global Organization for MVIP) was inaugurated 1994 as a neutral industrial organization therefor. However, the performance of data transfer by using ATM-type buses along with control buses has conventionally remained unknown.

SUMMARY OF THE INVENTION

The present invention has been developed under the above-described circumstances, and has the object of offering an ATM bus system which is able to handle increases in the amount and types of data for multi-media communications, process data in real-time, and easily manage changes in the size and generation patterns of processing data.

In order to achieve the object, the present invention offers an ATM bus system, for performing data transfers in an asynchronous transfer mode based on fixed-length cell units on a bus for data transmission, which transfers a single cell unit of data when a plurality of bus use requests for performing data transfers on an ATM bus have been generated, said ATM bus system has arbitration means to select a single bus use request from among a plurality of bus use requests simultaneously made by the plurality of bus users, connected to said ATM bus, for performing data transfers by sharing said ATM bus, and designating the bus user which issued said single bus use request; wherein each of said cell units have an expansion header in addition to ATM bus data containing an ATM header; said expansion header comprises bus use request data for said bus users to issue bus use requests to said bus arbitration means, bus use allowance data representing the single bus user designated by said bus arbitration means, and user address data for designating transmission and reception bus users; said bus arbitration means performs an arbitration of the plurality of bus use requests of said bus use request data, and notifies all of the bus users of bus use permission granted to the single bus user by using said bus use allowance data; and said bus users examine said bus use allowance data, whereby only the single bus user which has received bus use permission transfers a cell unit of data within the same cell time as a transfer of said expansion header, and the bus user designated by said user address data receives ATM bus data.

BRIEF DESCRIPTION OF THE DRAWINGS

FIG. 6 is a diagram showing the temporal change in the state of use of the ATM bus due to the bus users 10a and 10b in the same ATM bus system.

FIG. 7 is a diagram showing the temporal change in the state of use of the ATM bus due to only the bus users 10b in the same ATM bus system.

FIG. 8 is a diagram showing the temporal change in the state of use of the ATM bus due to the bus users 10c and 10d in the same ATM bus system.

PREFERRED EMBODIMENTS OF THE INVENTION

Hereinbelow, the embodiments of the present invention will be explained with reference to the drawings.

|Embodiment 1|

Figure 1:
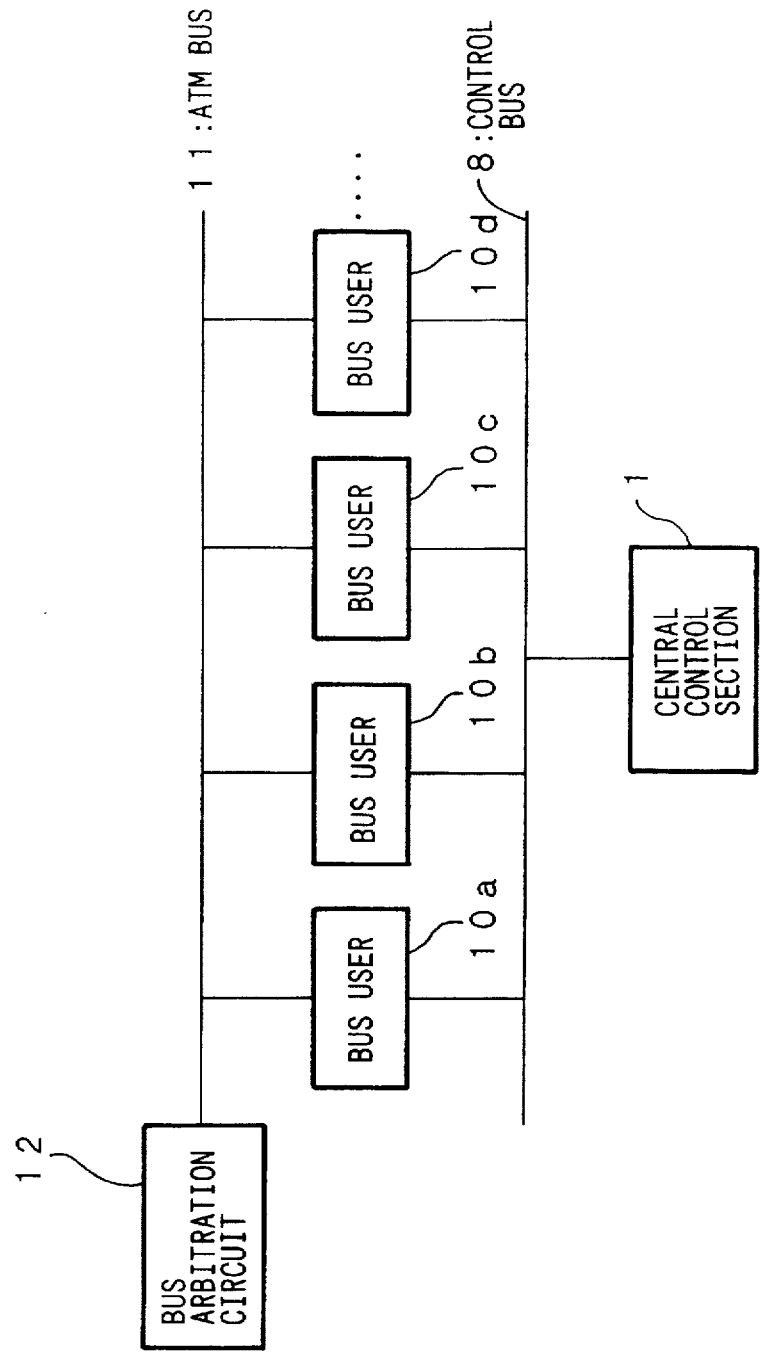
FIG. 1 is a block diagram showing the structure of an ATM bus system according to the first and second embodiments of the present invention.
Figure 16:
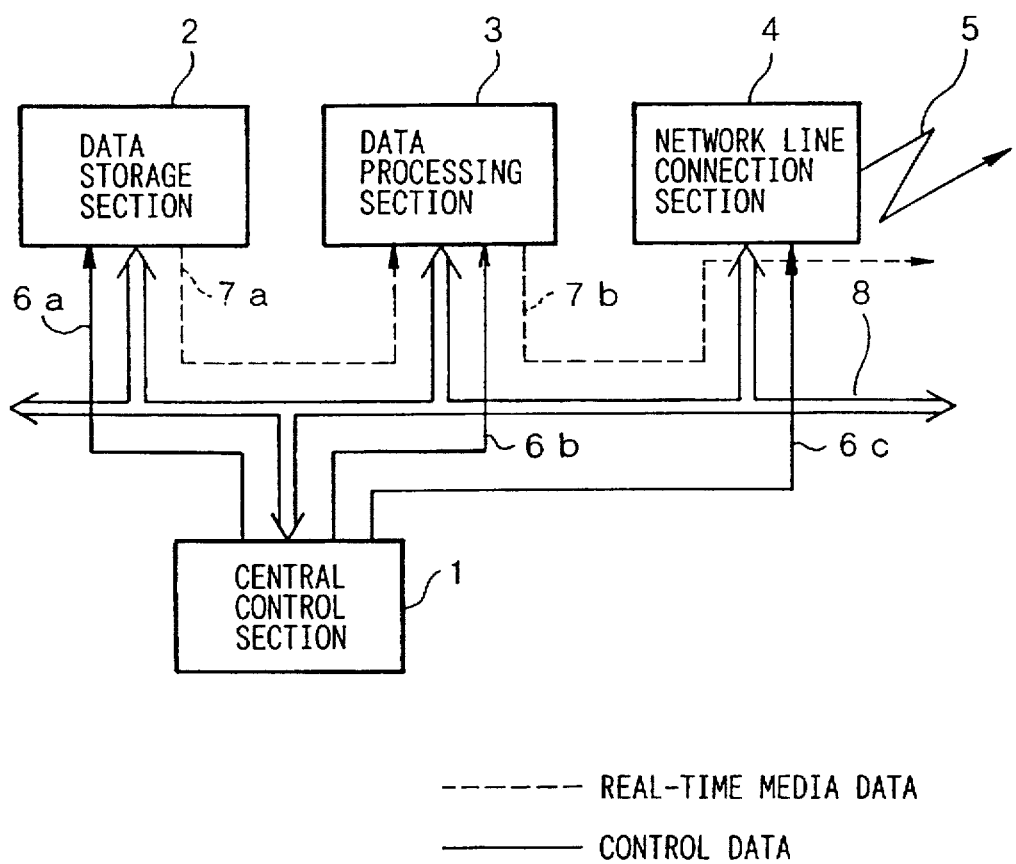
FIG. 16 is a block diagram showing the basic structure of a conventional data transfer system.

FIG. 1 is a block diagram showing the structure of an ATM bus system according to the first embodiment of the present invention. In the drawing, the portions which correspond to parts in FIG. 16 have been given the same reference numerals, and their explanations will be omitted.

In the same drawing, reference numerals $10a$~$10d$ denotes bus users in an ATM bus system. The bus users $10a$~$10d$ are assigned different addresses, so that the bus user is able to be immediately identified by indicating the address. Reference numeral 11 denotes an ATM bus which is a common data transfer route of this ATM bus system. Each bus user $10a$~$10d$ is able to perform a direct data transfer to any partner on this bus via the ATM bus 11. In this case, the transferred data are real-time media data. Reference numeral 12 denotes a bus arbitration circuit. In normal buses, only a single data transfer can be performed at a time. For this reason, the bus arbitration circuit 12 decides which bus user is able to send data at a certain time, thereby arbitrating the competition which occurs because the bus users $10a$~$10d$ share a common data transfer route. The control bus 8 is the transfer route which is used when the central control section 1 transfers control signals to the bus users $10a$~$10d$, and is not used for the transfer of real-time media data.

Figure 2:
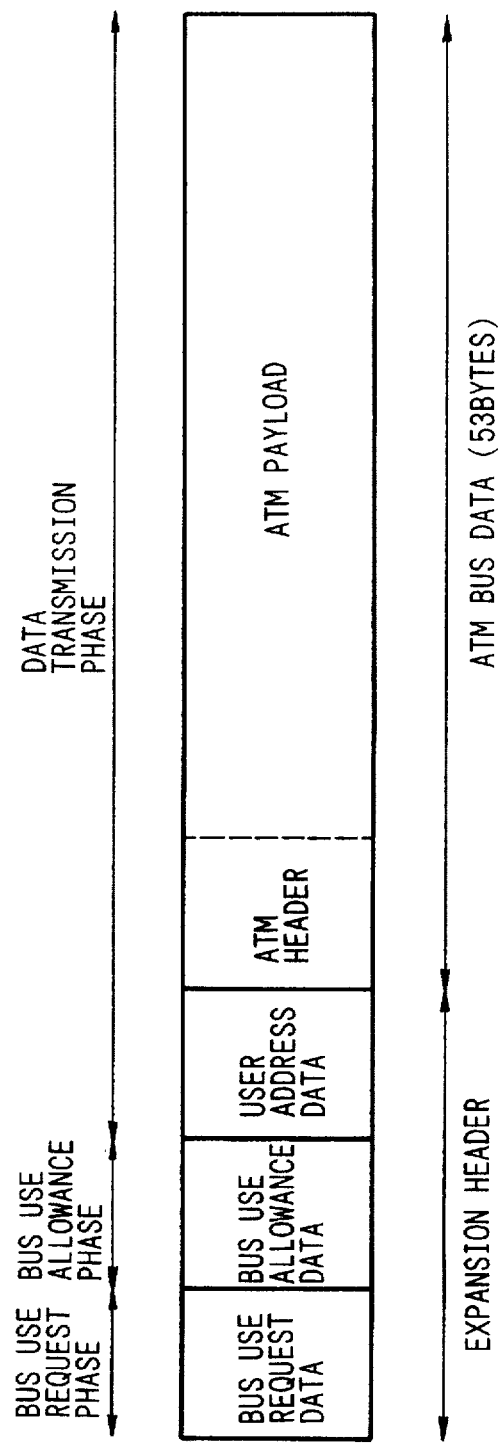
FIG. 2 is a diagram showing an example of the structure of a single unit cell on an ATM bus of an ATM bus system according to the first, second and fourth embodiments of the present invention.
Figure 3:
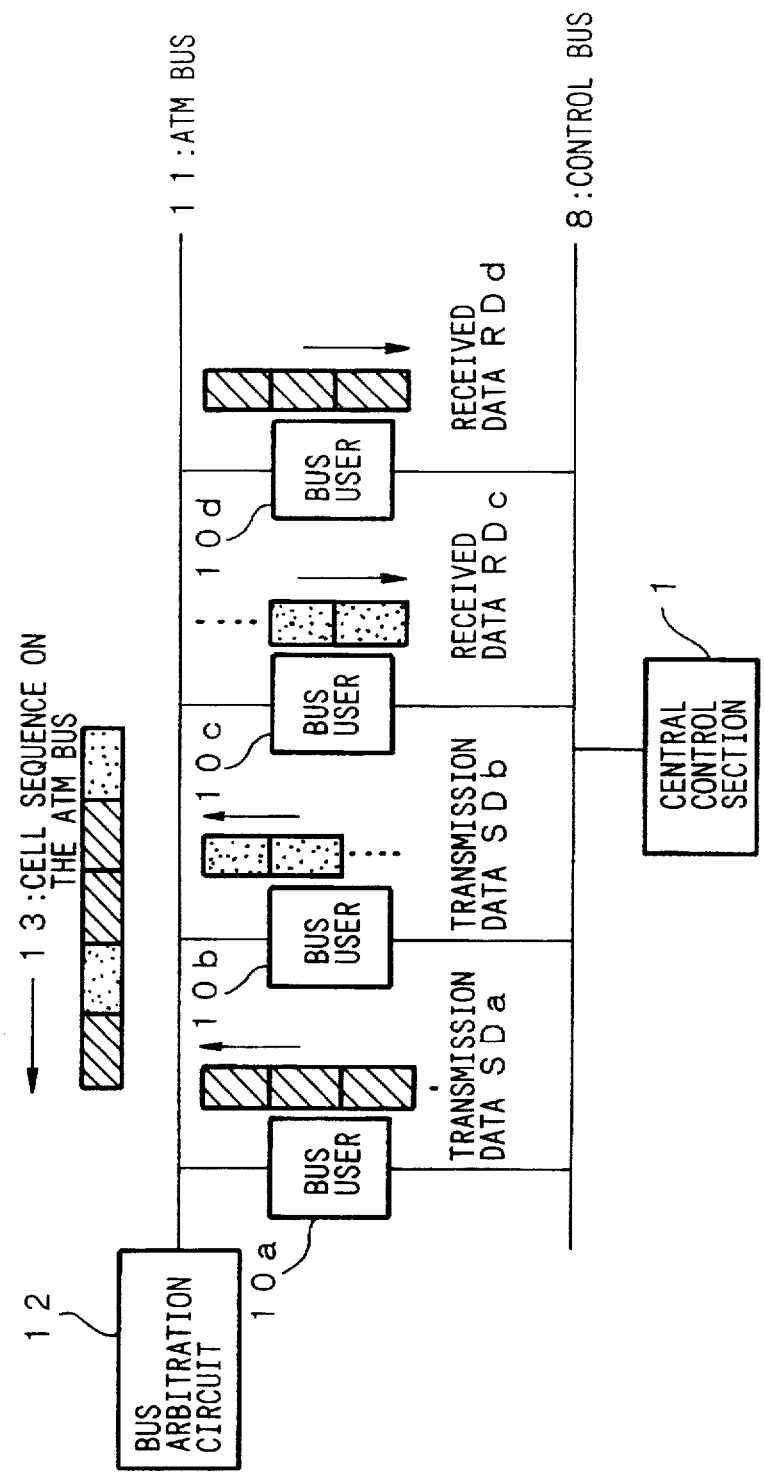
FIG. 3 is a diagram showing the operating conditions of an ATM bus system according to the first embodiment of the present invention.

On the other hand, this ATM bus system performs data transfer in an ATM transfer mode wherein the data is transferred by a plurality of cells having fixed-length cell units. FIG. 2 shows an example of the data structure of one cell unit on the ATM bus. As shown in the drawing, each cell unit of data is formed from an extension header provided on the leading end and ATM bus data. Furthermore, the extension headers are formed from three types of data fields of bus use request data, bus use allowance data and bus user address data.

In this case, the bus use request data in the extension header is a field containing request data for each bus user to request the bus arbitration circuit 12 to be allowed to use the ATM bus 11. The bus use allowance data is a data field for designating a single bus user which the bus arbitration circuit 12 has selected from among the bus users which have requested bus use according to a procedure to be explained below. The user address data is a data field containing addresses for designating bus users when a bus user sends data to another bus user.

The ATM bus data have 53 bytes and are formed from an ATM header according to the international standard ITU-TS (International Telecommunications Union - Telecommunications Standardization Section) or the ATM forum and an ATM payload which is a data field.

Next, the operation of an ATM bus system according to the above structure will be explained with reference to FIG.

3. In this example, data are transferred from the bus user 10a to the bus user 10d, and data are transferred from the bus user 10b to the bus user 10c. The central control section 1 instructs, by way of the control bus 8, the bus users 10a and 10b to send data. As a result, the bus user 10a sends the sent data SDa to the ATM bus 11 by the cell unit, and the data are received by the bus user 10d by the cell unit as received data RDd. In the same manner, the bus user 10b sends sent data SDb to the ATM bus 11 by the cell unit, and the data are received by the bus user 10c by the cell unit as received data RDc. In the diagram, reference numeral 13 indicates the cell sequence on the ATM bus 11, demonstrating that the cells are sequentially filed on the ATM bus 11 in the order determined by the bus arbitration circuit 12.

The data transfer is performed by continuously repeating the three steps of a bus use request phase, a bus use allowance phase and a data transmission phase as shown in FIG. 2 for each cell time. The phases will be explained below with reference to FIGS. 1 and 2.

(1) Bus Use Request Phase

When there is a request for a data transfer using the bus, each bus user 10a~10d shares bus use request data to notify the bus arbitration circuit 12 of the request via the ATM bus 11.

(2) Bus Use Allowance Phase

The bus arbitration circuit 12 monitors the bus use request data received from each bus user 10a~10d for the relevant cell time, and determines which bus users are requesting bus use. As a result of the monitor, a single bus user is chosen from among the plurality of bus users which have requested bus use according to a pre-determined procedure, and is granted permission to send a single cell of data using the ATM bus 11. After a single bus user has been selected in the above manner, data relating to the selected bus user are sent to all of the bus users 10a~10d via the ATM bus 11 as bus use allowance data.

(3) Data Transmission Phase

Each of the bus users 10a~10d which have requested bus use examine the bus use allowance data contained in the data received from the bus arbitration circuit 12 in order to determine whether or not it has received permission for a data transfer. As a result of the determination, the bus user which has received permission for the data transfer sends a single cell of data to the ATM bus 11. Simultaneously, each bus user 10a~10d examines the user address data, and if the address designated in the data matches with the receiving address, then it receives the ATM bus data which follows the user address data. In this way, data is transmitted between the bus users 10a~10d by fixed-length cell units.

With the present embodiment as explained above, the control signals are transferred by the control bus 8, and the real-time media data are transferred by the ATM bus 11. Therefore, when transferring a continuous video signal by means of the ATM network, the transfer cannot be interrupted even if the central control section 1 gives a send instruction to the bus user 10b via the control bus 8 while transferring the video signal from the bus user 10a to the bus user 10d, since the video signal from the bus user 10a is transferred via the ATM bus 11. Thus, the control signals and the real-time media data are kept completely apart by being transferred through separate buses in order to avoid any mutual influences. For this reason, there is no competition between the two types of signals, and the real-time processing of data such as continuous video signals is achieved.

Furthermore, aside from taking partial charge of the functions of the control bus 8 as a data transfer bus, the ATM bus 11 has the following characteristics due to the use of an ATM format as the data transfer method. The ATM format is a format in which all of the data are divided into fixed-length packets (having 53 bytes+an expansion header in the present case) called cells which are transferred at high speed, whereby it is possible to freely select a transfer rate which does not depend on the amount of communications traffic or the generation patterns. Additionally, the ATM format allows the transfer state to be maintained because the simultaneous, multiple and continuous data do not influence each other. Moreover, the real time media data is transferred directly through the ATM bus 11 in the ATM format, so that the network line connection section does not require a converter in order for the transfer data to be connected to the ATM network, thereby preventing the degradation of the data quality during the network connection.

[Embodiment 2]

While multi-media communications require the simultaneous transfer of real-time media data to multiple bus users within a computer, i.e. multiple address communications, conventional multiple address communications are performed by communicating with the multiple bus users to which the data are transferred one at a time. That is, in order to transfer the same data to multiple users according to the conventional methods, the data must be stored and the transfer addresses must be designated for each transfer. However, these types of methods require a lot of time, proportional to the number of bus users on the receiving end in order to completely send all of the data to the bus users.

In order to resolve this problem, there is a method wherein transmission is performed while address data for all of the bus users on the receiving end or address data capable of simultaneously specifying all of the bus users on the receiving end are contained in the header portions of the data cells. However, in these cases, the generation of address data for the transmission routes of the bus users on the sending end and the determination procedure for the reception routes of the bus users on the receiving end (the procedure for determining whether or not the address data within the header indicate the specified address data) become complicated, thus increasing the communications processing time.

The invention according to the second embodiment has been made under these circumstances, and relates to an ATM bus system which can easily perform multiple address communications between a single transmission side bus user and a plurality of reception side bus users on an ATM bus.

While this embodiment will be explained below, the structure of the ATM bus system according to this embodiment is identical to the ATM bus system according to the first embodiment as shown in FIG. 1. Additionally, the data cells according to the present embodiment are similar to the data cells of the first embodiment shown in FIG. 2, except that transmission side user addresses are indicated instead of reception side user addresses as user address data in the expansion headers. Furthermore, the bus arbitration circuit 12 performs arbitration in exactly the same manner.

Next, a multiple address communications operation of an ATM bus system according to the above structure will be explained with reference to FIG. 4. In this example, a multiple address communication is performed from the bus user 10a to the bus users 10b and 10c. First, when a request for transmission of data from the bus user 10a to the bus users 10b and 10c is issued, the bus users 10b and 10c are set with the address of the bus user 10a via the control bus 8. Then, the bus users 10b and 10c respectively store the address in internal memories of the receiving circuits which are not shown in the drawings. Next, the bus user 10a which is on the transmission side stores the data to be sent in the ATM payload portion of the data cell and stores its own (the bus user 10a) address in the user address data portion of the expansion header. Then, the bus user 10a sends the data cell produced in the above manner onto the ATM bus 11 using a transmission route circuit which is not shown.

The bus user 10b on the receiving end constantly monitors the ATM bus 11, so that when a data cell is supplied to the ATM bus 11, it takes in the data cell using a reception route circuit and reads out the transmission side user address data stored in the expansion header portion of the cell. Then, the bus user 10b compares the transmission side user address data with the address stored in its internal memory (the address set via the control bus 8). If the addresses match, then the bus user 10b reads out the data within the ATM payload portion. At that time, a procedure identical to that explained above for the case of the bus user 10b (taking in the data cell, comparing the addresses, and reading out the data in the payload portion) is performed simultaneously and in parallel for the bus user 10c. That is, taking in the data cell, comparing the addresses, and reading out the data in the payload portion are performed separately and in parallel for the bus user 10b and the bus user 10c. A multiple address communication is performed from the bus user 10a to the bus users 10b and 10c according to the above-described procedure.

Figure 4:
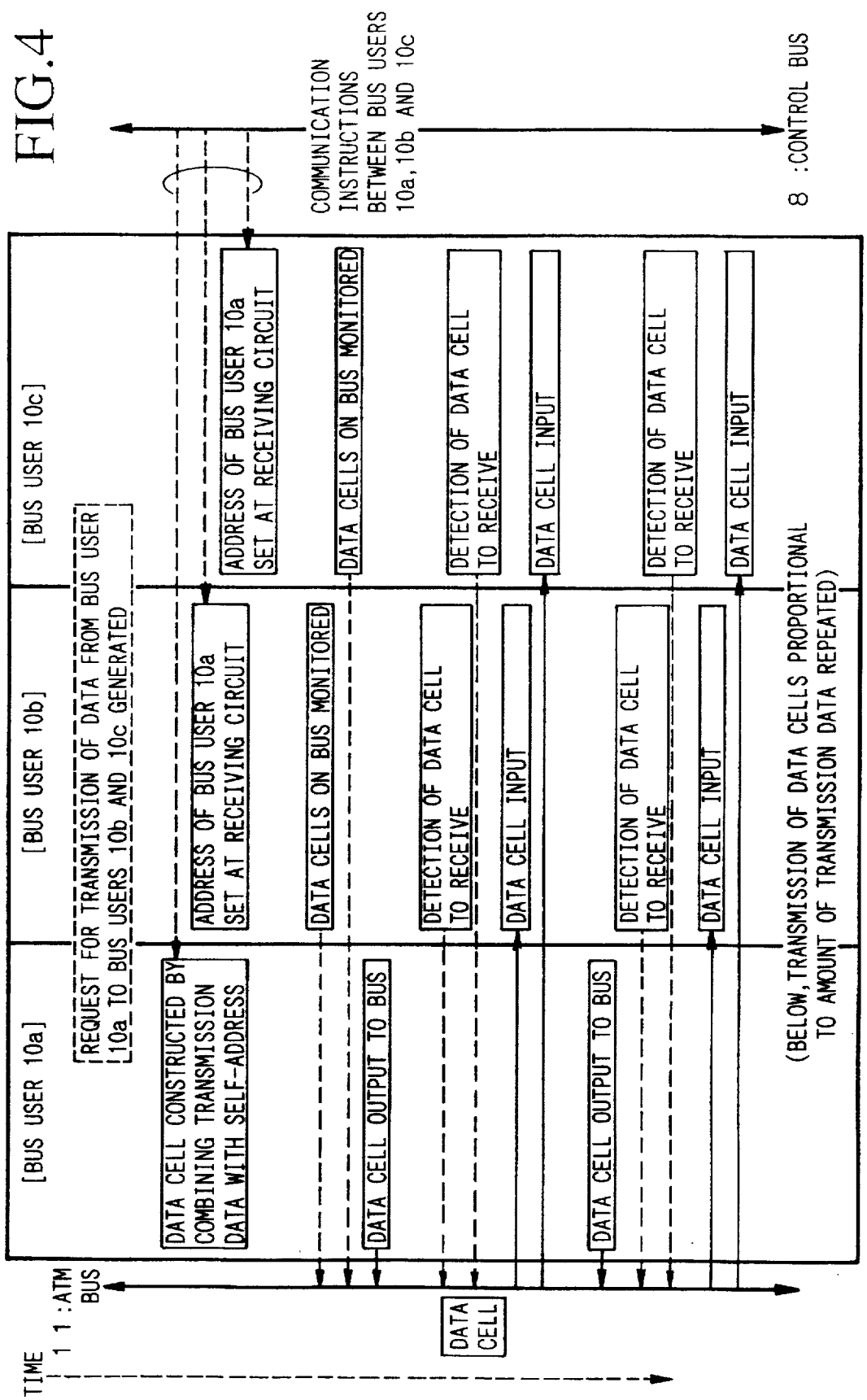
FIG. 4 is a diagram showing the operating conditions of a broadcast in the ATM bus system according to the second embodiment of the present invention.

The bus user 10a stores data by dividing them into a plurality of data cells, then sends the data cells to the ATM bus 11 separately as shown in FIG. 4. Then, the bus users 10b and 10c receive the plurality of data cells sent to the ATM bus 11 separately by the same procedure as with the above-explained receiving method in order to read data from the ATM payload portions of the data cells. In this manner, the multiple address communications method on the ATM bus system according to the present embodiment allows the parallel and simultaneous reception of data by multiple reception side bus users, so that the time required for the data communications procedures is reduced in comparison to conventional methods. Furthermore, the transmission side bus users only need to store their own addresses for the procedure of storing address data in the data cells, and the reception side bus users only need to detect the transmission side user address data received via the control bus 8, thereby simplifying the procedures for the bus users on both the transmission side and the reception side.

[Embodiment 3]

When a bus user wishes to transfer data with priority, the bus user adds a priority level indicating the priority of the data transfer when notifying the bus arbitration circuit of a bus use request. Upon receiving the bus request, the bus arbitration circuit begins arbitration from the highest priority level based on the attached priority levels. The invention according to the third embodiment relates to arbitration methods for the bus arbitration circuit for cases in which there are multiple priority levels.

Figure 9:
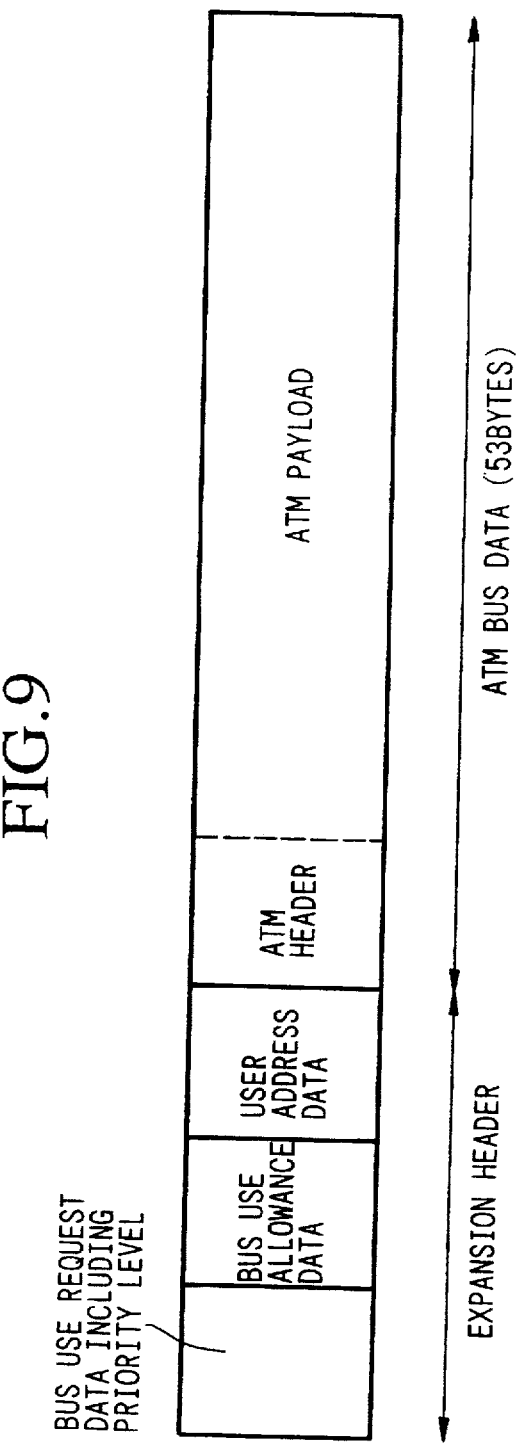
FIG. 9 is a diagram showing an example of the structure of a single unit cell on an ATM bus of the ATM bus system according to the third embodiment of the present invention.

Below, the third embodiment of the present invention will be explained with reference to the diagrams. The operations of the above-mentioned ATM bus system will be explained with reference to FIGS. 5~8. The structure of the data cells sent and received in this case is shown in FIG. 9.

Figure 5:
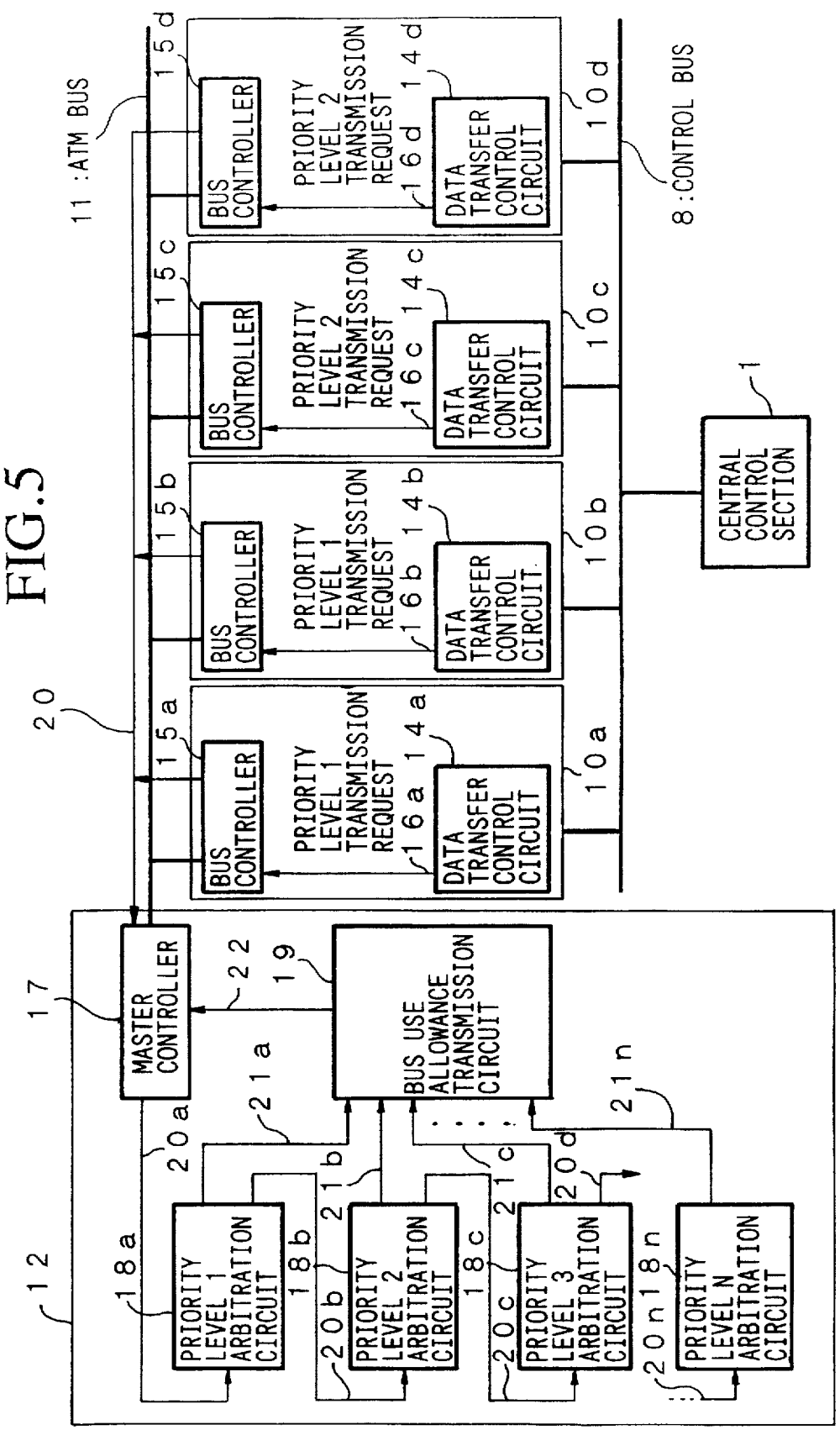
FIG. 5 is a block diagram showing the structure of an ATM bus system according to the third embodiment of the present invention.

FIG. 5 is a block diagram showing the composition of the ATM bus system according to the same embodiment. In the drawing, the portions corresponding to parts shown in FIG. 1 are given the same reference numerals, and their explanations will be omitted.

With regard to the bus users 10a~10d, reference numerals 14a~14d denote data transfer control circuits which select one from among a plurality of provided priority levels to perform the use request to the ATM bus 11 and the data transfer. Additionally, reference numerals 15a~15d denote bus controllers having input/output functions on the ATM bus 11.

With regard to the bus arbitration circuit 12, reference numeral 17 denotes a master controller which controls the input and output of the bus controllers 15a~15d of the bus users 10a~10d. Reference numerals 18a, 18b, 18c, ..., 18n denote priority level arbitration circuits, which performs an arbitration of bus use allowance for priority level 1, priority level 2, priority level 3, ..., priority level n, in the order of highest priority. Furthermore, reference numeral 19 denotes a bus use allowance transmission circuit which collects arbitration results from the priority level arbitration circuits 18a~18n and notifies all of the bus users 10a~10d of permission to use the bus via the master controller 17. In this case, the order is such that priority level 1 has the highest priority, followed by priority level 2, priority level 3, ..., with priority level n having the lowest priority. Additionally, the number of priority level arbitration circuits 18a~18n provided is equal to the number of priority levels supported by the present system.

In the bus use request phase, when the bus users 10a~10d have data which needs to be transferred, the data transfer control circuits 14a~14d select one from among the plurality of priority levels and transmits bus use request data 20 with the selected priority level data 16a~16d to the master controller 17 via the bus controllers 15a~15d. Then, the master controller 17 sends the received bus use request data 20a to the priority level 1 arbitration circuit 18a. The diagram shows the situation wherein the bus users 10a and 10b have designated priority level 1 and the bus users 10c and 10d have designated priority level 2.

In the bus use allowance phase, if there are any priority level 1 requests, the priority level 1 arbitration circuit 18a performs an arbitration between the priority level 1 data within the bus use request data 20a. Within the same priority level, the bus users are selected in order and without discrimination. Then, the arbitration result 21a is sent to the bus use allowance transmission circuit 19. On the other hand, if no priority level 1 requests exist, then the bus use request data 20b are sent to the priority level 2 arbitration circuit 18b. If there are any priority level 2 requests, the priority level 2 arbitration circuit 18b sends the arbitration results 21b to the bus use allowance transmission circuit 19. If there are no such requests, the bus use request data 20c are sent to the priority level 3 arbitration circuit 18c. In the same manner, each arbitration circuit performs an arbitration if there are any requests at the corresponding priority level, then transfers the arbitration results to the bus use allowance transmission circuit 19. When the bus use allowance transmission circuit 19 receives one of the arbitration results 21a~21n, the bus use allowance circuit 19 sends bus use allowance data 22, containing data relating to the bus users selected by the arbitration results, to the master controller 17. Then, the master controller 17 notifies all of the bus users 10a~10d of the bus use allowance data 22 through the ATM bus 11. In the case shown by example in the diagram, the bus users 10a, 10b, 10c and 10d have respectively designated priority levels 1, 1, 2 and 2, so that the priority level 1 arbitration circuit 18a sends the arbitration result 21a, granting permission to either the bus user 10a or the bus user 10b, to the bus use allowance transmission circuit 19. The bus use allowance data 22 which allow use of the ATM bus 11 are then sent to the bus users 10a ~10d.

In the data transmission phase, the bus users 10a~10d which have requested bus use examine the bus use allowance data contained in the data received from the bus arbitration circuit 12 in order to determine whether or not they have received permission for a data transfer. If the determination reveals that transfer permission has been granted, then one cell of data is sent from the relevant bus user to the ATM bus 11. In this example, the bus users 10a and 10b reciprocally transfer data. This situation is shown in FIG. 6.

FIG. 6 illustrates the flow of data on the ATM bus when the bus users have the priority levels shown in FIG. 5. Since the situation is such that:

Bus user 10a has priority level 1

Bus user 10b has priority level 1

Bus user 10c has priority level 2

Bus user 10d has priority level 2 the bus users 10a and 10b perform data transfers in reciprocating fashion.

FIG. 7 illustrates the situation of FIG. 6 wherein the bus user 10a is no longer requesting use, such that:

Bus user 10a is not requesting use

Bus user 10b has priority level 1

Bus user 10c has priority level 2

Bus user 10d has priority level 2 and only the bus user 10b is performing a data transfer.

FIG. 8 illustrates the situation of FIG. 7 wherein the bus user 10b is no longer requesting use, such that:

Bus user 10a is no longer requesting use

Bus user 10b is no longer requesting use

Bus user 10c has priority level 2

Bus user 10d has priority level 2 and the bus is being used by the bus users 10c and 10d in reciprocating fashion.

As explained above, the invention according to the present embodiment is system wherein a single ATM bus is shared by a plurality of bus users, the bus arbitration circuit is notified of priority level data which are contained within the bus use request data of the bus users, and the bus arbitration circuit selects the bus use requests from the bus users having the highest priority to grant the right to use the bus. As a result, the present invention allows the bus users having data of higher priority to be given priority for using the ATM bus for data transfer.

[Embodiment 4]

When expanding the ATM bus 11 shown in FIG. 1 in order to increase the data transfer capacity of the ATM bus 11, there is a method wherein the bit width of the ATM bus 11 is expanded while leaving the control bus 8 and the bus cycle formed from the bus use request phase, the bus use allowance phase and the data communication phase identical before and after the expansion, so that the amount of data transferred for each transfer is expanded. However, in this method, while bus users corresponding to the new bit width can be connected to the expanded ATM bus 11, bus users corresponding to the bit width of the ATM bus 11 prior to expansion cannot be connected. Furthermore, the master controller of the bus arbitration circuit 12 must be changed so as to correspond to the bit width of the ATM bus 11 after expansion.

The invention according to the fourth embodiment was made under consideration of these problems, and relates to an ATM bus system which allows bus users corresponding to the bit width of the ATM bus prior to expansion to connect to the ATM bus after expansion.

Figure 10:
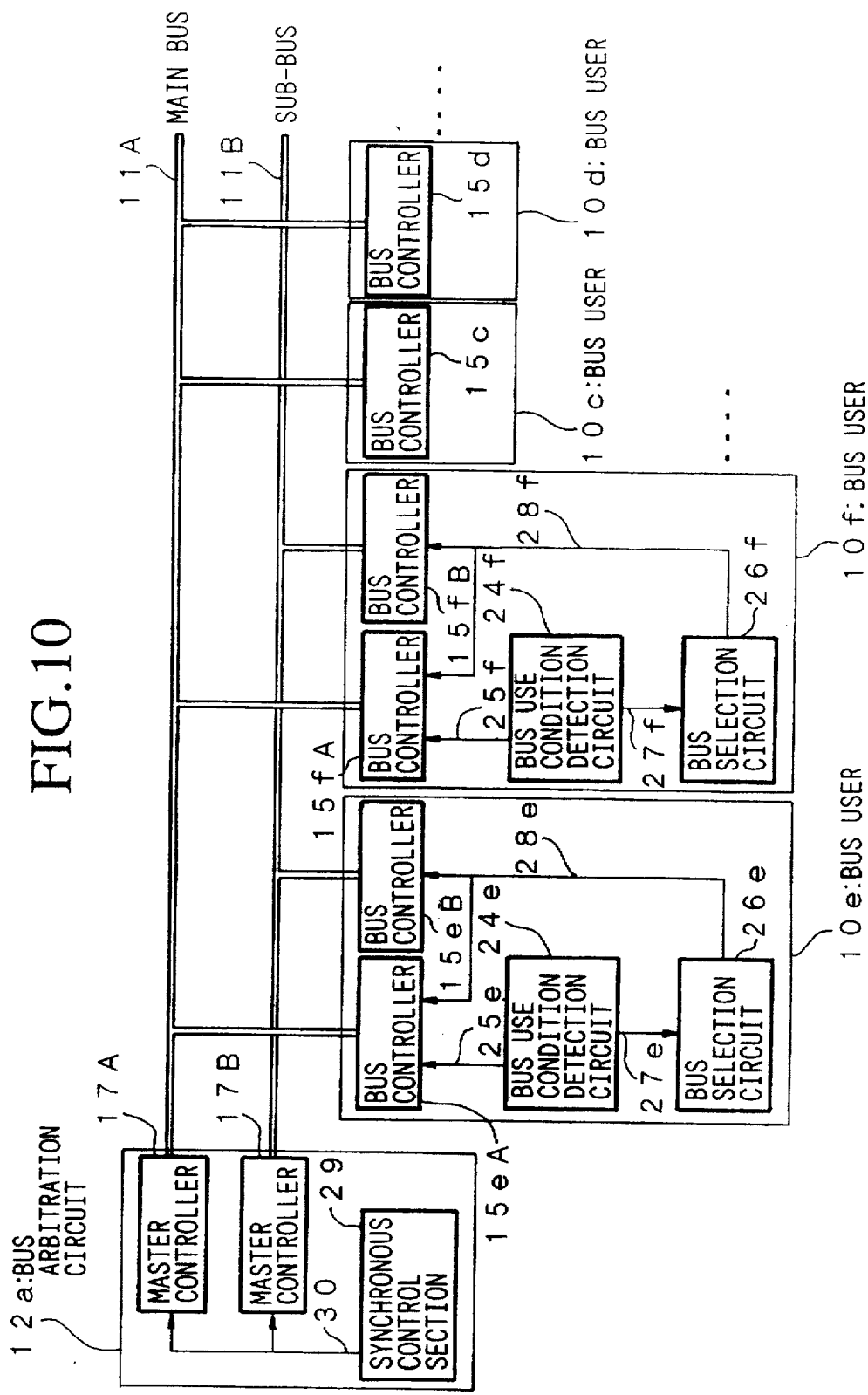
FIG. 10 is a block diagram showing the structure of an ATM bus system according to the fourth embodiment of the present invention.

The fourth embodiment of the present invention will be explained below with reference to the drawings. FIG. 10 is a block diagram showing the structure of an ATM bus system according to the fourth embodiment. In the diagram, the portions which correspond to parts shown in FIG. 1 have been given the same reference numerals, and their explanation will be omitted. The central control section 1 and the control bus 8 have been omitted from the drawing.

The ATM bus system shown in the diagram has two ATM buses, identical to the pre-expansion ATM bus 11 and disposed in parallel, referred to as the main bus 11A and the sub-bus 11B. Here, the main bus 11A is the first ATM bus used during data transfer, while the sub-bus 11B is an ATM bus which is used when the data transfer in the main bus 11A is congested. Bus controllers 15c and 15d of the bus users 10c and 10d corresponding to the pre-expansion ATM bus are connected to the main bus 11A. Reference numeral 10e denotes a bus user provided to replace the bus user 10a, having two bus controllers 15eA and 15eB with the same capabilities as the bus controllers 15c and 15d of the bus users 10c and 10d. One of the bus controllers 15eA is connected to the main bus 11A, while the other bus controller 15eB is connected to the sub-bus 11B. Additionally, reference numeral 24e refers to a bus use condition detection circuit, which monitors the state of use of the main bus 11A by use condition data 25e from the bus controller 15eA. Furthermore, reference numeral 26e denotes a bus selection circuit which switches between buses by the minimum units of data transfer according to bus congestion data 27e which is transferred when the bus use condition detection circuit 24e detects congestion in the main bus 11A by means of the use condition data 25e. At this time, the bus selection circuit 26e outputs a bus controller control signal 28e, for selecting the bus to be used, to the bus controllers 15eA and 15eB.

Reference numeral 10f refers to a bus user provided to replace the bus user 10b, having the same structure as the bus user 10e. The bus controller 15fA of this bus user 10f is connected to the main bus 11A, while the bus controller 15fB is connected to the sub-bus 11B. Reference numeral 12a denotes a bus arbitration circuit which performs an arbitration of the bus use of both the main bus 11A and the sub-bus 11B, and synchronizes both bus cycles. In this bus arbitration circuit 12a, 17A and 17B are master controllers which have the same functions as the master controllers provided in the bus arbitration circuit 12 before expansion and respectively control the bus controllers connected to the main bus 11A and the sub-bus 11B. Additionally, reference numeral 29 denotes a synchronous control section which synchronizes the bus cycles of the main bus 11A and the sub-bus 11B according to the same synchronization signal 30.

Next, the operation of an ATM bus system according to the above-described structure will be explained. The bus users 10c and 10d are connected to only the main bus 11A, and operate in exactly the same manner as prior to expansion using the main bus 11A. The bus users 10e and 10f are connected to both the main bus 11A and the sub-bus 11B. When transferring a single unit of data, the buses are not used simultaneously; the main bus 11A is first used. Then, the sub-bus 11B is only used when the bus condition detection circuits 24e and 24f have determined that the main bus 11A is congested. The data transfer between these bus users is performed based on a bus use request phase, a bus use allowance phase and a data communication phase as with the first embodiment.

Figure 11:
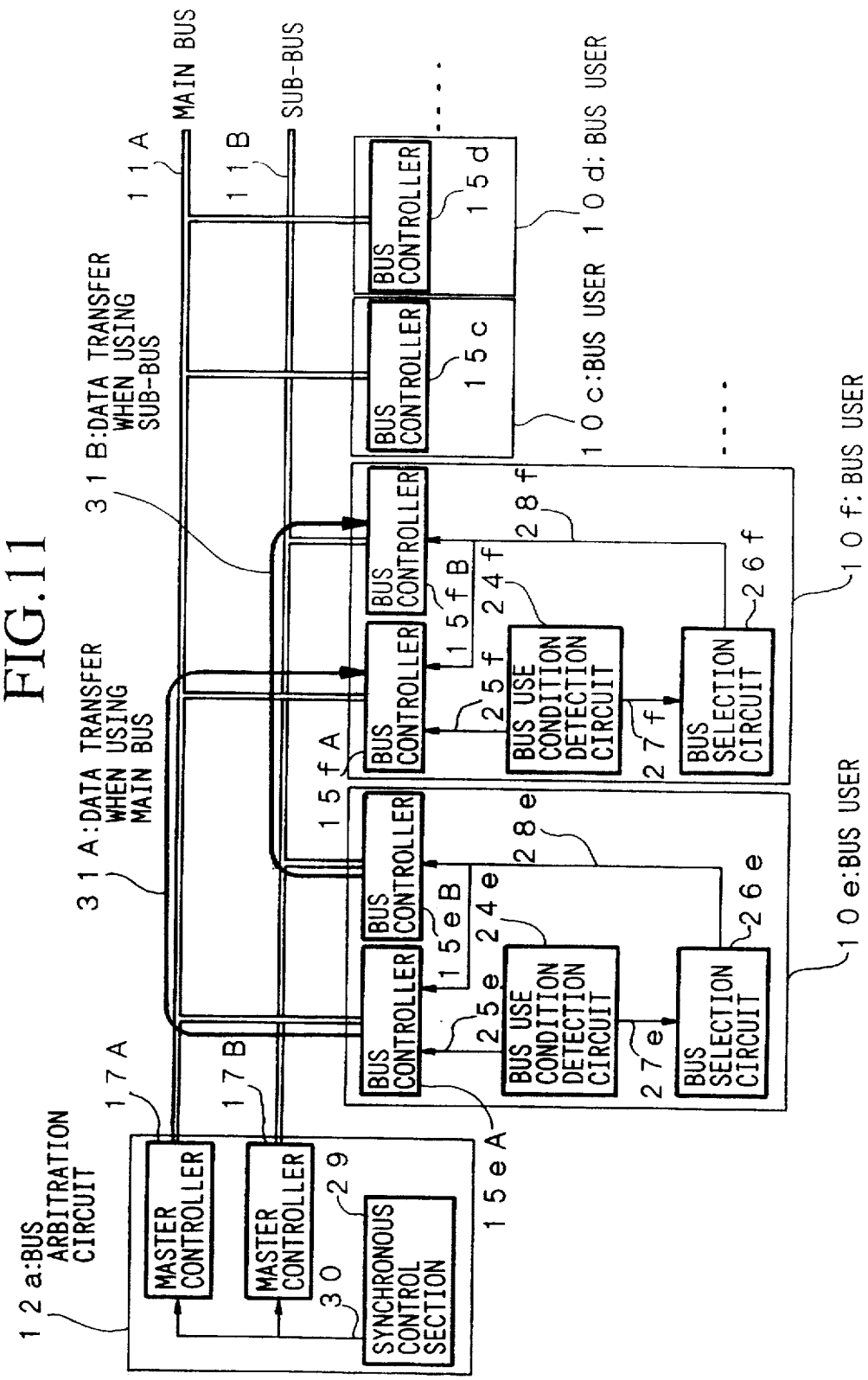
FIG. 11 is a diagram showing a data transfer operation between post-extension users for the same ATM bus system.

An example of the operation of the ATM bus system according to the above structure will be explained below. First, data transfer between the bus users 10e and 10f corresponding to bus expansion will be explained with reference to FIG. 11. In this case, data is transferred from the bus user 10e to the bus user 10f. The bus user 10e performs a data transfer 31A to the bus user 10f using the main bus 11A. Then, if the main bus 11A is being used by another bus user, the bus use condition detection circuit 24e of the bus user 10e determines that the main bus 11A is congested based on the use condition data 25e and sends bus congestion data 27e to the bus selection circuit 26e.

Next, the bus selection circuit 26e receives the bus congestion data 27e and instructs the bus controller 15eA connected to the main bus 11A to stop the data transfer. At the same time, the bus controller 15eB connected to the sub-bus 11B is instructed to transfer data. As a result, the data transfer 31A being performed by the main bus 11A is switched to a data transfer 31B by the sub-bus 11B. At that time, the bus user 10f is receiving data from the main bus 11A, but then begins to receive data from the sub-bus 11B by means of the switching of the transfer bus of the bus user 10e. In this case, while the bus user 10f simultaneously receives the data on the main bus 11A and the sub-bus 11B, the procedure is performed by discriminating the data to be received according to addresses recorded in the user address data.

Then, when the other bus user stops using the main bus 11A and the main bus 11A goes into a state of disuse, the bus use condition detection circuit 24e determines that the congestion of the main bus 11A has been resolved. As a result, the bus selection circuit 26e instructs the bus controller 15eB to stop transferring data and instructs the bus controller 15eA to transfer data, by means of a bus controller control signal 28e. Thus, the data transfer 31B on the sub-bus 11B is switched to a data transfer 31A on the main bus 11A, and the bus user 10f starts receiving data from the main bus 11A.

Figure 12:
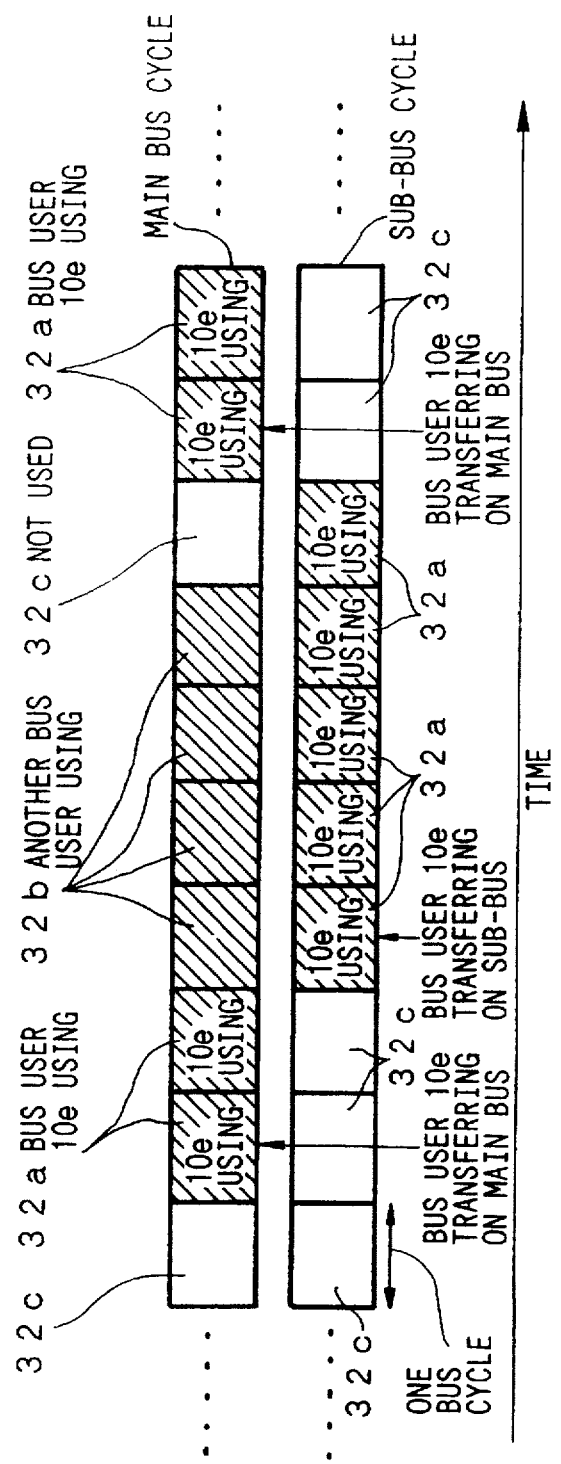
FIG. 12 is a diagram showing the temporal change in the state of use of the main bus and the sub-bus during the same data transfer.

FIG. 12 is a diagram showing the temporal changes in the state of bus use of the main bus 11A and the sub-bus 11B. In this example, if the main bus 11A becomes congested while the bus user 10e is using the main bus 11A to transfer data to the bus user 10f, the bus user 10e uses the sub-bus 11B, then starts using the main bus 11A again after the congestion of the main bus 11A is resolved. In the diagram, each frame indicates a bus cycle, and the frame 32a marked "10e using" indicates the bus cycle which the bus user 10e used for data transfer. Additionally, the frame 32b indicates the bus cycle that another bus user used for data transfer, and the frame 32c indicates an unused bus cycle.

Figure 13:
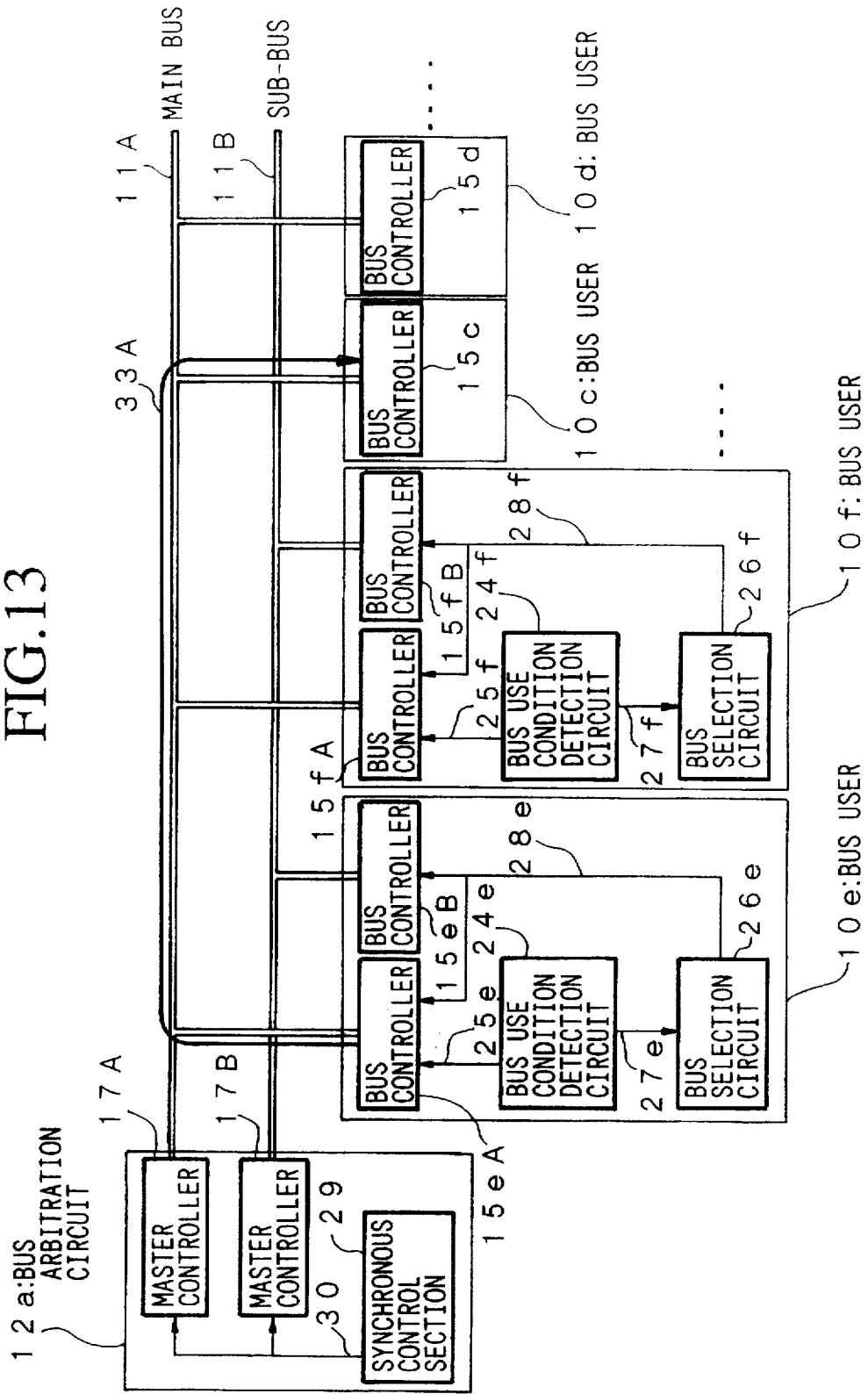
FIG. 13 is a diagram showing a data transfer operation from a post-extension bus user to a pre-extension bus user for the same ATM bus system.

Next, a data transfer between a bus user 10c corresponding to pre-expansion and a bus user 10e corresponding to expansion will be explained with reference to FIG. 13. In this case, the bus user 10e is transferring data to the bus user 10c. First, the bus user 10e performs a data transfer 33A to the bus user 10 using the main bus 11A, then another bus user begins to use the main bus 11A. However, at this time the bus user 10e does not perform the same switching operation, determining that the main bus 11A is congested, from a data transfer 33A on the main bus 11A to a data transfer on the sub-bus 11B. That is, the bus user 10c cannot receive data from the sub-bus 11B, so the bus user 10e cannot perform a data transfer when the main bus 11A is congested. In this case, the bus user 10e can be kept from performing a switching operation to a sub-bus 11B while the main bus 11A are congested by pre-recording the addresses of the bus users 10c and 10d corresponding to pre-expansion through the control bus 8. Then, when the main bus 11A goes into a state of disuse and the bus use condition detection circuit 24e determines that the congestion of the main bus 11A has been resolved, the data transfer 33A to the bus user 10c using the main bus 11A is restarted.

Figure 14:
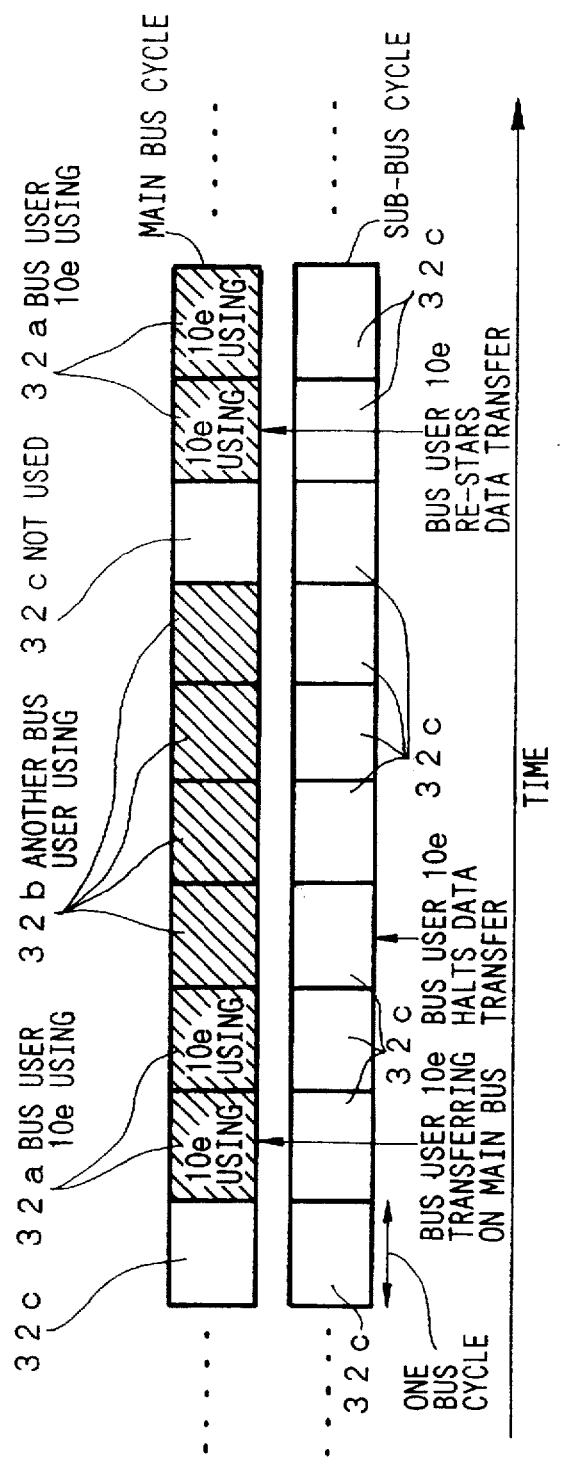
FIG. 14 is a diagram showing an example of the temporal change in the state of use of the main bus and the sub-bus during the same data transfer.

FIG. 14 is a diagram showing the temporal changes in the bus use conditions of the main bus 11A and the sub-bus 11B for this case. The frames 32a, 32b and 32c are identical to the bus cycles of FIG. 12. In the same diagram, when the bus user 10e uses the main bus 11A to transfer data to the bus user 10c, the data transfer is stopped if the main bus 11A becomes congested, and the data transfer is restarted when the congestion is resolved.

Figure 15:
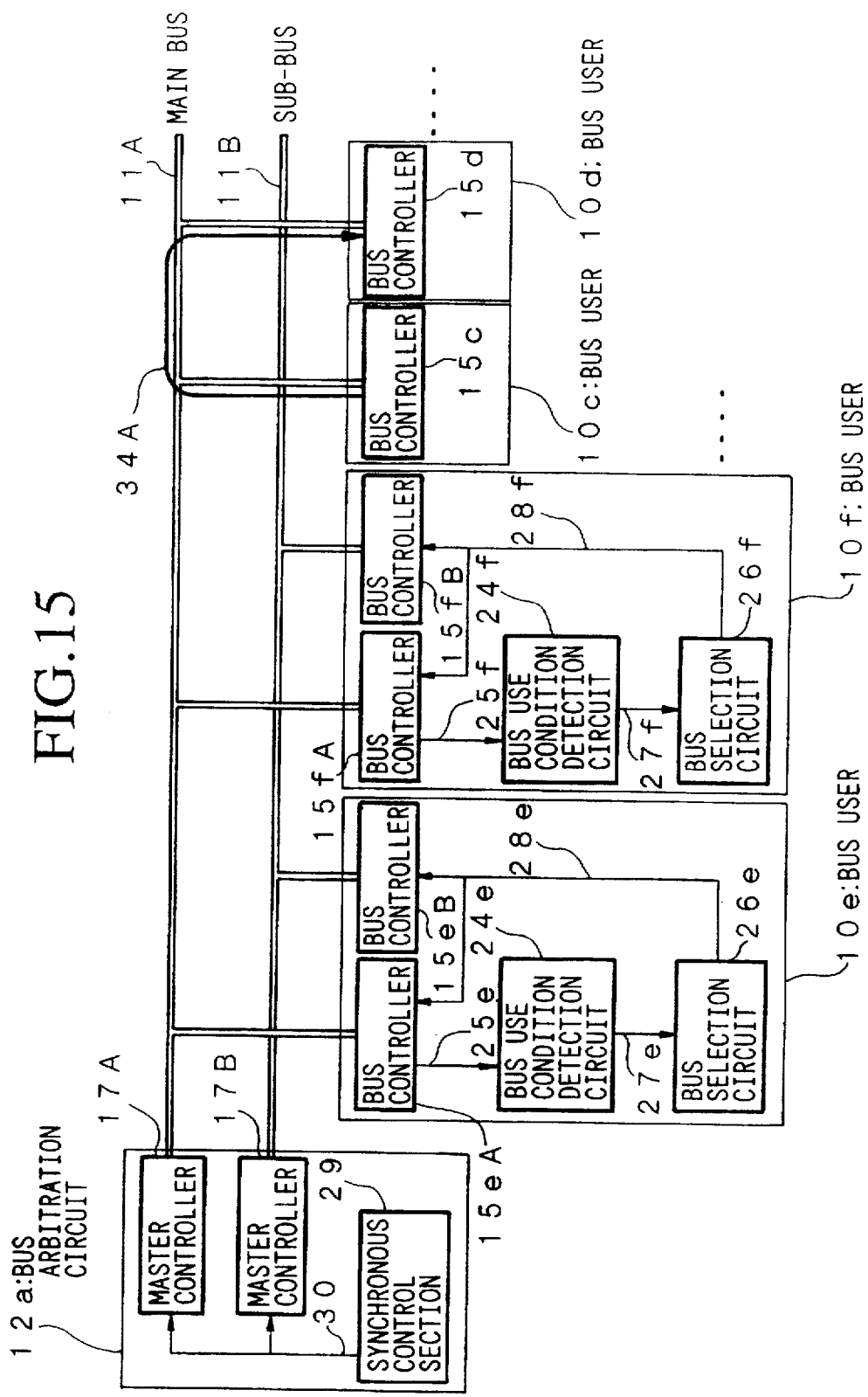
FIG. 15 is a diagram showing a data transfer operation between pre-extension users for the same ATM bus system.

Finally, a data transfer between the bus users 10c and 10d which correspond to pre-expansion will be explained with reference to FIG. 15. The diagram shows the case of a data transfer 34A from the bus user 10c to the bus user 10d. In this case, the data transfer is performed only through the main bus 11A since both the bus users 10c and 10d are connected only to the main bus 11A. That is, the data transfer is performed in exactly the same manner as prior to expansion.

Thus, the invention according to the fourth embodiment has two ATM buses arranged in parallel and having the same bit width as prior to expansion as shown in FIG. 10. Bus users corresponding to pre-expansion are able to be connected to the main bus in order to use only the main bus. Bus users which correspond to bus expansion and are connected to both of the buses use the main bus when transferring data to bus users corresponding to pre-expansion, and normally use the main bus when transferring data to bus users corresponding to bus expansion, and use the sub-bus only when the main bus is congested. The determination of whether the main bus is congested can be performed by monitoring the bus use request data (see FIG. 2) on the main bus. Furthermore, transmission side bus users corresponding to bus expansion do not simultaneously use both buses in the same bus cycle in order to maintain the order of data arrival at the receiving side bus users. Additionally, the receiving side bus users are capable of receiving data simultaneously from separate bus users within the same bus cycle. Then, the bus arbitration circuit of the present invention has a synchronization control section which completely synchronizes the bus cycles so that there is no need to re-adjust the timing within the bus users to the switched bus cycle each time the bus users switch buses.

According to the above-described structure, the data transfer capacity of the ATM buses is doubled by expanding the buses by arranging two pre-expansion ATM buses in parallel. Additionally, it is possible to use both bus users corresponding to bus expansion and bus users corresponding to pre-expansion since both the main bus and the sub-bus after expansion have bit widths equal to that of the pre-expansion ATM bus. Furthermore, the bus users corresponding to pre-expansion can perform data transfers in the same manner as prior to expansion by connecting the bus users corresponding to pre-expansion to the main bus.

While four possible embodiments of the present invention have been explained above with reference to the drawings, the detailed structure need not be restricted to these embodiments, so that any modifications which do not counter the gist of the present invention would still fall within the scope of the invention.

We claim:

1. An ATM bus system for transferring data in an asynchronous transfer mode using fixed-length cell units, the ATM bus transferring a single cell unit of data when a plurality of bus use requests for transferring data on an ATM bus are generated, said ATM bus system comprising:

a plurality of bus users connected to said ATM bus and sharing said ATM bus to transfer data; and bus arbitration means for selecting a single bus use request from among a plurality of bus use requests simultaneously sent from said bus users, and for designating the bus user that issued said selected bus use request; wherein each of said cell units include an expansion header in addition to an ATM bus header, said expansion header having bus use request data for indicating which said bus users issue bus use requests to said bus arbitration means, user address data for indicating bus users that have sent or are to receive data, and bus allowance data for indicating the designated bus user;

said bus arbitration means performing an arbitration of the plurality of bus use requests based on said bus use request data and notifying all of the bus users of bus use permission granted to the selected bus user through said bus use allowance data; and wherein said bus users examine said bus use allowance data so that only the bus user designated by the allowance data transfers a cell unit of data within the same cell time as a transfer of said expansion header, and each bus user decides whether or not to receive ATM bus data in the transferred cell unit of data based on the user address data in the same cell unit of data.

2. An ATM bus system according to claim 1, further comprising:

central control means for controlling procedures and data transfers performed by said bus users; and a control bus for transferring control data from said central control means to said bus users in order to control said bus users.

3. An ATM bus system according to claim 2, having a plurality of priority levels indicating priority levels of said data transfers; wherein each of said bus users selects a single priority level from among said plurality of priority levels and adds said selected priority level to said bus use request data; and said arbitration means performs a multi-level priority bus arbitration wherein bus use permission is granted from among the bus use requests in a single priority level, of which there are no bus use requests of a higher priority level, by ignoring the bus use requests of priority levels lower than said single priority level.

4. An ATM bus system according to claim 1, having a plurality of priority levels indicating priority levels of said data transfers, wherein each of said bus users selects a single priority level from among said plurality of priority levels and adds said selected priority level to said bus use request data; and said arbitration means performs a multi-level priority bus arbitration wherein bus use permission is granted from among the bus use requests in a single priority level, of which there are no bus use requests of a higher priority level, by ignoring the bus use requests of priority levels lower than said single priority level.

5. An ATM bus system for transferring data in an asynchronous transfer mode using fixed-length cell units, the ATM bus transferring a single cell unit of data when a plurality of bus use requests for transferring data on an ATM bus are generated, said ATM bus system comprising:

a plurality of bus users connected to said ATM bus and sharing said ATM bus to transfer data;

bus arbitration means for selecting a single bus use request from among a plurality of bus use requests simultaneously sent from said bus users, and for designating the bus user that issued said selected bus use request;

central control means for controlling procedures and data transfers performed by said bus users; and a control bus for transferring control data from said central control means to said bus users in order to control said bus users; wherein each of said cell units include an expansion header in addition to an ATM bus header, said expansion header having bus use request data for indicating which said bus users issue bus use requests to said bus arbitration means, user address data for indicating bus users that have sent or are to receive data, and bus allowance data for indicating the designated bus user;

said bus arbitration means performing an arbitration of the plurality of bus use requests based on said bus use request data and notifying all of the bus users of bus use permission granted to the selected bus user through said bus use allowance data;

said bus users examine said bus use allowance data so that only the bus user designated by the allowance data transfers a cell unit of data within the same cell time as a transfer of said expansion header, and each bus user decides whether or not to receive ATM bus data in the transferred cell unit of data based on the user address data in the same cell unit of data;

the addresses of the bus users which transmit data are preset through the control bus with respect to all bus users which receive data;

each of the bus users which transmit data applies its own bus user address to the expansion header of a cell unit and sends said cell unit to the ATM bus through a transmission circuit within said bus user; and each of the bus users which receive data work in parallel to compare the transmitting user address preset through said control bus with the address in the cell unit on the ATM bus, and receive said cell unit when the addresses match.

6. An ATM bus system according to claim 5, having a plurality of priority levels indicating priority levels of said data transfers; wherein each of said bus users selects a single priority level from among said plurality of priority levels and adds said selected priority level to said bus use request data; and said arbitration means performs a multi-level priority bus arbitration wherein bus use permission is granted from among the bus use requests of priority level, of which there are no bus use requests of a higher priority level, by ignoring the bus use requests of priority levels lower than said single priority level.

7. An ATM bus system according to claim 6, wherein said ATM bus including a main bus and an identical sub-bus arranged in parallel;

said bus arbitration means includes two master controllers separately arbitrating said bus use requests from said bus users during each data transfer on said main bus and said sub-bus and a synchronization control section for synchronizing bus cycles of said main bus and said sub-bus;

said bus users being connected to said main bus and sharing said main bus and said sub-bus;

each of said bus users further comprises:

bus controllers, connected respectively to said main bus and said sub-bus, which respectively output said bus use requests to said master controllers when data is to be transferred, and respectively performing data transfer when bus use permission has been granted by said master controllers;

bus use condition detection means for determining a condition of use of the ATM bus; and bus selection means for switching transfer of each cell unit of data between said main bus and said sub-bus based on bus congestion data from said bus use condition detection means; and wherein said bus users normally use said main bus for transferring each cell unit of data, and use said sub-bus only when said bus use condition detection means determines that the main bus is congested.

8. An ATM bus system according to claim 5, wherein the ATM bus includes a main bus and an identical sub-bus arranged in parallel;

said bus arbitration means includes two master controllers separately arbitrating said bus use requests from said bus users during each data transfer on said main bus and said sub-bus, and a synchronization control section for synchronizing bus cycles of said main bus and said sub-bus;

said bus users being connected to said main bus and sharing said main bus and said sub-bus;

each of said bus users further comprising:

bus controllers, connected respectively to said main bus and said sub-bus, which respectively output said bus use requests to said master controllers when data is to be transferred, and respectively performing data transfer when bus use permission has been granted by said master controllers;

bus use condition detection means for determining a condition of use of the ATM bus; and bus selection means for switching transfer of each cell unit of data between said main bus and said sub-bus based on bus congestion data from said bus use condition detection means; and wherein said bus users normally use said main bus for transferring each cell unit of data, and use said sub-bus only when said bus use condition detection means determines that the main bus is congested.

9. An ATM bus system for transferring data in an asynchronous transfer mode using fixed-length cell units, the ATM bus transferring a single cell unit of data when a plurality of bus use requests for transferring data on an ATM bus are generated, said ATM bus system comprising:

a plurality of bus users connected to said ATM bus and sharing said ATM bus to transfer data, the ATM bus including a main bus and an identical sub-bus arranged in parallel, said bus users being connected to said main bus and sharing said main bus and said sub-bus; and bus arbitration means for selecting a single bus use request from among a plurality of bus use requests simultaneously sent from said bus users, and for designating the bus user that issued said selected bus use request, the bus arbitration means including two master controllers separately arbitrating said bus use requests from said bus users during each data transfer on said main bus and said sub-bus, and a synchronization control section for synchronizing bus cycles of said main bus and said sub-bus;

each of said bus users further comprising:

bus controllers, connected respectively to said main bus and said sub-bus, which respectively output said bus use requests to said master controllers when data is to be transferred, and respectively performing data transfer when bus use permission has been granted by said master controllers;

bus use condition detection means for determining a condition of use of the ATM bus; and bus selection means for switching transfer of each cell unit of data between said main bus and said sub-bus based on bus congestion data from said bus use condition detection means; and wherein said bus users normally use said main bus for transferring each cell unit of data, and use said sub-bus only when said bus use condition detection means determines that the main bus is congested; and further wherein each of said cell units include an expansion header in addition to an ATM bus header, said expansion header having bus use request data for indicating which said bus users issue bus use requests to said bus arbitration means, user address data for indicating bus users that have sent or are to receive data, and bus allowance data for indicating the designated bus user;

said bus arbitration means performing an arbitration of the plurality of bus use requests based on said bus use request data and notifying all of the bus users of bus use permission granted to the selected bus user through said bus use allowance data; and wherein said bus users examine said bus use allowance data so that only the bus user designated by the allowance data transfers a cell unit of data within the same cell time as a transfer of said expansion header, and each bus user decides whether or not to receive ATM bus data in the transferred cell unit of data based on the user address data in the same cell unit of data.

10. An ATM bus system for transferring data in an asynchronous transfer mode using fixed-length cell units, the ATM bus transferring a single cell unit of data when a plurality of bus use requests for transferring data on an ATM bus are generated, said ATM bus system comprising:

a plurality of bus users connected to said ATM bus and sharing said ATM bus to transfer data, the ATM bus including a main bus and an identical sub-bus arranged in parallel, said bus users being connected to said main bus and sharing said main bus and said sub-bus;

bus arbitration means for selecting a single bus use request from among a plurality of bus use requests simultaneously sent from said bus users, and for designating the bus user that issued said selected bus use request, the bus arbitration means including two master controllers separately arbitrating said bus use requests from said bus users during each data transfer on said main bus and said sub-bus, and a synchronization control section for synchronizing bus cycles of said main bus and said sub-bus;

central control means for controlling procedures and data transfers performed by said bus users; and a control bus for transferring control data from said central control means to said bus users in order to control said bus users;

each of said bus users further comprising:

bus controllers, connected respectively to said main bus and said sub-bus, which respectively output said bus use requests to said master controllers when data is to be transferred, and respectively performing data transfer when bus use permission has been granted by said master controllers;

bus use condition detection means for determining a condition of use of the ATM bus; and bus selection means for switching transfer of each cell unit of data between said main bus and said sub-bus based on bus congestion data from said bus use condition detection means; and wherein said bus users normally use said main bus for transferring each cell unit of data, and use said sub-bus only when said bus use condition detection means determines that the main bus is congested; and further wherein each of said cell units include an expansion header in addition to an ATM bus header, said expansion header having bus use request data for indicating which said bus users issue bus use requests to said bus arbitration means, user address data for indicating bus users that have sent or are to receive data, and bus allowance data for indicating the designated bus user;

said bus arbitration means performing an arbitration of the plurality of bus use requests based on said bus use request data and notifying all of the bus users of bus use permission granted to the selected bus user through said bus use allowance data; and wherein said bus users examine said bus use allowance data so that only the bus user designated by the allowance data transfers a cell unit of data within the same cell time as a transfer of said expansion header, and each bus user decides whether or not to receive ATM bus data in the transferred cell unit of data based on the user address data in the same cell unit of data.

11. An ATM bus system for transferring data in an asynchronous transfer mode using fixed-length cell units, the ATM bus transferring a single cell unit of data when a plurality of bus use requests for transferring data on an ATM bus are generated, said ATM bus system comprising:

a plurality of bus users connected to said ATM bus and sharing said ATM bus to transfer data, the ATM bus including a main bus and an identical sub-bus arranged in parallel, said bus users being connected to said main bus and sharing said main bus and said sub-bus, and having a plurality of priority levels indicating priority levels of said data transfers, each of said bus users selecting a single priority level from among said plurality of priority levels and adding said selected priority level to said bus use request data; and bus arbitration means for selecting a single bus use request from among a plurality of bus use requests simultaneously sent from said bus users, and for designating the bus user that issued said selected bus use request, the bus arbitration means including two master controllers separately arbitrating said bus use requests from said bus users during each data transfer on said main bus and said sub-bus, and a synchronization control section for synchronizing bus cycles of said main bus and said sub-bus, said arbitration means performing a multi-level priority bus arbitration wherein bus use permission is granted from among the bus use requests in a single priority level, of which there are no bus use requests of a higher priority level, by ignoring the bus use requests of priority levels lower than said single priority level; wherein each of said bus users further comprising:

bus controllers, connected respectively to said main bus and said sub-bus, which respectively output said bus use requests to said master controllers when data is to be transferred, and respectively performing data transfer when bus use permission has been granted by said master controllers;

bus use condition detection means for determining a condition of use of the ATM bus; and bus selection means for switching transfer of each cell unit of data between said main bus and said sub-bus based on bus congestion data from said bus use condition detection means; wherein said bus users normally use said main bus for transferring each cell unit of data, and use said sub-bus only when said bus use condition detection means determines that the main bus is congested; and further wherein each of said cell units include an expansion header in addition to an ATM bus header, said expansion header having bus use request data for indicating which said bus users issue bus use requests to said bus arbitration means, user address data for indicating bus users that have sent or are to receive data, and bus allowance data for indicating the designated bus user;

said bus arbitration means performing an arbitration of the plurality of bus use requests based on said bus use request data and notifying all of the bus users of bus use permission granted to the selected bus user through said bus use allowance data; and wherein said bus users examine said bus use allowance data so that only the bus user designated by the allowance data transfers a cell unit of data within the same cell time as a transfer of said expansion header, and each bus user decides whether or not to receive ATM bus data in the transferred cell unit of data based on the user address data in the same cell unit of data.

12. An ATM bus system for transferring data in an asynchronous transfer mode using fixed-length cell units, the ATM bus transferring a single cell unit of data when a plurality of bus use requests for transferring data on an ATM bus are generated, said ATM bus system comprising:

a plurality of bus users connected to said ATM bus and sharing said ATM bus to transfer data, the ATM bus including a main bus and an identical sub-bus arranged in parallel, said bus users being connected to said main bus and sharing said main bus and said sub-bus; and having a plurality of priority levels indicating priority levels of said data transfers, each of said bus users selecting a single priority level from among said plurality of priority levels and adding said selected priority level to said bus use request data; and bus arbitration means for selecting a single bus use request from among a plurality of bus use requests simultaneously sent from said bus users, and for designating the bus user that issued said selected bus use request, the bus arbitration means including two master controllers separately arbitrating said bus use requests from said bus users during each data transfer on said main bus and said sub-bus, and a synchronization control section for synchronizing bus cycles of said main bus and said sub-bus, said arbitration means performing a multi-level priority bus arbitration wherein bus use permission is granted from among the bus use requests in a single priority level, of which there are no bus use requests of a higher priority level, by ignoring the bus use requests of priority levels lower than said single priority level;

central control means for controlling procedures and data transfers performed by said bus, users; and a control bus for transferring control data from said central control means to said bus users in order to control said bus users;

each of said bus users further comprises:

bus controllers, connected respectively to said main bus and said sub-bus, which respectively output said bus use requests to said master controllers when data is to be transferred, and respectively performing data transfer when bus use permission has been granted by said master controllers;

bus use condition detection means for determining a condition of use of the ATM bus; and bus selection means for switching transfer of each cell unit of data between said main bus and said sub-bus based on bus congestion data from said bus use condition detection means; and wherein said bus users normally use said main bus for transferring each cell unit of data, and use said sub-bus only when said bus use condition detection means determines that the main bus is congested; and further wherein each of said cell units include an expansion header in addition to an ATM bus header, said expansion header having bus use request data for indicating which said bus users issue bus use requests to said bus arbitration means, user address data for indicating bus users that have sent or are to receive data, and bus allowance data for indicating the designated bus user;

said bus arbitration means performing an arbitration of the plurality of bus use requests based on said bus use request data and notifying all of the bus users of bus use permission granted to the selected bus user through said bus use allowance data; and wherein said bus users examine said bus use allowance data so that only the bus user designated by the allowance data transfers a cell unit of data within the same cell time as a transfer of said expansion header, and each bus user decides whether or not to receive ATM bus data in the transferred cell unit of data based on the user address data in the same cell unit of data.

* * * * *

UNITED STATES PATENT AND TRADEMARK OFFICE
CERTIFICATE OF CORRECTION

PATENT NO.    : 5,796,741
DATED         : August 18, 1998
INVENTOR(S)   : Kazuo Saito et al.

It is certified that error appears in the above-identified patent and that said Letters Patent is hereby corrected as shown below:

Title page,
Item [57], ABSTRACT,
Line 6, "10A~10d" should read -- 10a~10d --.

Column 16, claim 10,
Line 60, "buš, users" should read -- bus users --.

Column 19, claim 12,
Line 2, "bus, users" should read -- bus users --.

Signed and Sealed this

Eleventh Day of December, 2001

*Attest:*

NICHOLAS P. GODICI
*Attesting Officer*   *Acting Director of the United States Patent and Trademark Office*